US007784957B2

(12) United States Patent
Wright

(10) Patent No.: US 7,784,957 B2
(45) Date of Patent: Aug. 31, 2010

(54) RECESSED LIGHT FIXTURE AND SPEAKER COMBINATION

(76) Inventor: Doug S. Wright, 3554 Quincy Ave., Simi Valley, CA (US) 93063

( * ) Notice: Subject to any disclaimer, the term of this patent is extended or adjusted under 35 U.S.C. 154(b) by 100 days.

(21) Appl. No.: 12/177,310

(22) Filed: Jul. 22, 2008

(65) Prior Publication Data

US 2008/0298045 A1 Dec. 4, 2008

Related U.S. Application Data

(63) Continuation-in-part of application No. 11/424,855, filed on Jun. 17, 2006, now abandoned.

(60) Provisional application No. 60/691,378, filed on Jun. 17, 2005.

(51) Int. Cl.
*H04M 1/22* (2006.01)

(52) U.S. Cl. .......................... 362/86; 362/234; 362/285

(58) Field of Classification Search .................. 362/86, 362/234, 231, 285, 269
See application file for complete search history.

(56) References Cited

U.S. PATENT DOCUMENTS

| | | | | |
|---|---|---|---|---|
| 3,194,952 | A * | 7/1965 | Wells | 362/86 |
| 7,535,341 | B2 * | 5/2009 | Haase | 340/326 |
| 7,604,378 | B2 * | 10/2009 | Wolf et al. | 362/253 |
| 2005/0237218 | A1 * | 10/2005 | Tang et al. | 340/815.45 |

* cited by examiner

*Primary Examiner*—Ali Alavi
(74) *Attorney, Agent, or Firm*—Julio M. Loza; Loza & Loza, LLP

(57) ABSTRACT

At least one embodiment of the invention provides a recessed assembly combining a light fixture and a speaker assembly. The light fixture is a light source that is excited via an array of high-intensity light-emitting-diodes (LED) and is imbedded into a ceiling-mounted recessed assembly. The light fixture may be fashioned such that it closely mimics existing, commonly available recessed ceiling lighting assemblies. A speaker assembly is mounted within the recessed assembly so that both light and sound can be provided by the recessed assembly.

19 Claims, 15 Drawing Sheets

RECESSED LIGHT FIXTURE AND SPEAKER COMBINATION

CLAIM OF PRIORITY UNDER 35 U.S.C. §119

The present Application for Patent claims priority to U.S. patent application Ser. No. 11/424,855 filed Jun. 17, 2006, which claims priority to U.S. Prov. Patent Application Ser. No. 60/691,378 entitled "Recessed Light Fixture and Speaker Combination", by Doug S. Wright, filed Jun. 17, 2005, and expressly incorporated by reference herein.

FIELD

Various embodiments of the invention pertain to recessed lighting and audio fixtures. More particularly, at least one embodiment of the invention relates to a recessed light assembly having an integrated loudspeaker.

DESCRIPTION OF RELATED ART

In order to save space, and/or for aesthetic reasons, it is often desirable to mount light fixtures and speakers within wall or ceiling cavities or recesses. This is typically done by mounting separate light and speaker fixtures. However, these separate mountings require more openings to be cut into a wall or ceiling, often detracting from the aesthetics of the room or environment in which they are mounted.

SUMMARY

An embodiment of a recessed assembly including a housing having an open end and a partially closed end, a light fixture including an annular frame and a plurality of non-modulating, closely-spaced light-emitting diodes (LEDs) mounted within the annular frame, the light fixture centrally mounted within the housing toward the open end, a first speaker mounted within the annular frame of the light fixture, and a second speaker mounted within the housing toward the partially closed end and a distance behind the light fixture, wherein sound from the second speaker is substantially unobstructed by the light fixture and wherein the light-emitting diodes are operated independent of sounds from the first and second speakers is herein provided.

The recessed assembly may include LEDs mounted concentrically on a shelf within the annular frame, the annular frame defining an opening through which the first speaker is mounted. The recessed assembly may further include a plurality of optics mounted on the plurality of LEDs. The recessed assembly may further include moveable means on the light fixture. In one embodiment, the moveable means may include a socket pedestal, a rotational ball mount and a socket lock. The recessed assembly may further include an electronic device for controlling operation of the light fixture and the first and second speakers. The plurality of LEDs may provide an amount of light in range of between 500 lumens and 900 lumens. The recessed assembly may further include an extendible post coupled to the first speaker at one end and coupled to the second speaker at the other end, the extendible post permitting mounting the first speaker at different heights relative to the second speaker. The recessed assembly may further include an IP networking interface that permits uniquely addressing the recessed assembly. The housing may be adapted to be installed into a ceiling. The second speaker may be configured to generate sounds in a second frequency band and the first speaker may be configured to generate sounds in a first frequency band. The second frequency band may be a low frequency while the first frequency band may be a high frequency band.

An embodiment of a recessed assembly including housing means for securing the recessed assembly within a recessed space, a light fixture including supporting means and a plurality of non-modulating, closely-spaced light-emitting diodes (LEDs) mounted within the supporting means, the light fixture centrally mounted within the housing means; first sound-generating means for generating sounds in a first frequency band mounted within the supporting means; and second sound-generating means for generating sounds in a second frequency band, wherein sound from the second sound-generating means is substantially unobstructed by the light fixture is also provided. The recessed assembly may further include means for adjusting the intensity of the illumination means independently from the sound-generating means.

An embodiment of a light and speaker combination device, including a cylindrical housing having an open end and a partially closed end, an illumination device capable of providing an amount of light in range of between 500 lumens and 900 lumens mounted within the cylindrical housing, a first speaker coupled to the illumination device, and a second speaker mounted a distance in back of the first speaker and within the cylindrical housing wherein sound from the second speaker is substantially unobstructed by the illumination device and wherein the illumination device is operated independent of sounds from the first and second speakers is also provided.

The illumination device may include a plurality of non-pulsing, closely spaced light-emitting-diodes (LEDs). The LEDs may be mounted concentrically on an annular frame that defines an opening through which the first speaker is mounted. In one embodiment, the illumination device includes a fluorescent light source. In another embodiment, the illumination device includes a fiber optic light source. In some embodiments, the illumination device is rotatable.

DETAILED DESCRIPTION

Figure 1:
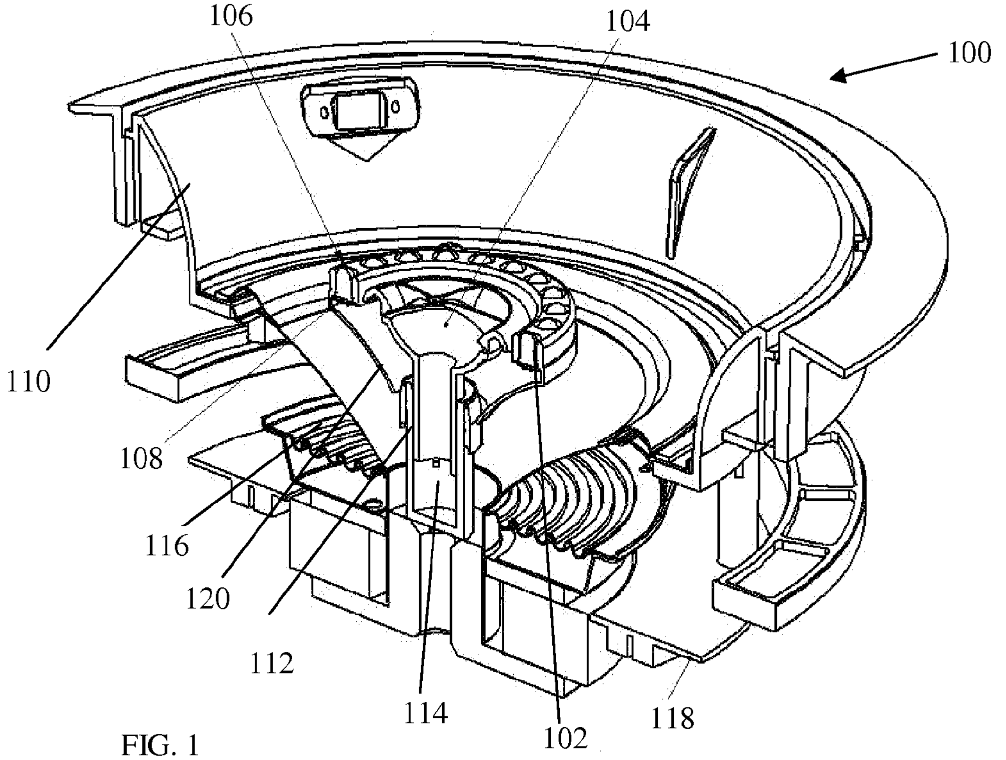
FIG. 1 illustrates a cross-sectional view of a recessed assembly having a light fixture and audio device combination according to one embodiment of the invention.

In the following description numerous specific details are set forth in order to provide a thorough understanding of the invention. However, one skilled in the art would recognize that the invention may be practiced without these specific details. In other instances, well known methods, procedures, and/or components have not been described in detail so as not to unnecessarily obscure aspects of the invention.

The following description, certain terminology is used to describe certain features of one or more embodiments of the invention. The term "audio device" refers to any type of sound-generating device, including a speaker, loudspeaker, audio speaker, woofer, subwoofer, tweeter, and/or acoustic transducer. The term "light fixture" refers to any type of light-generating device, including a fluorescent light, incandescent light, light-emitting diode light source, fiber optic light source, etc.

One aspect of the invention provides a recessed mounting assembly that permits housing both a light fixture and speaker in a single enclosure. Such combination of light and speaker systems is highly coveted since it minimizes the number and variation of fixtures mounted on/in a ceiling. That is, rather than installing separate light and speaker housings, a single enclosure is used to house both a light fixture and speaker.

Combining a light and speaker in the same fixture has several challenges. First, speakers typically include components that would be susceptible to the heat generated by conventional light bulbs. In the context of this Application, "conventional" may be an incandescent light bulb in power range from between thirty (30) to seventy-five (75) Watts with an output flux between two hundred (200) and eight hundred and fifty (850) lumens, or, a halogen light bulb in a power range from between forty (40) to seventy (70) Watts with an output flux between five hundred (500) and nine hundred (900) lumens. Second, in order to obtain a reasonable sound quality, the sound propagating from the speaker should not be impaired by the light fixture. Third, the life of conventional incandescent light bulbs may be shortened by the normal vibration of speakers during operation.

One embodiment of the present invention combines the functions of a light fixture and a speaker into a single recessed assembly. The light fixture may be an illuminator or light source that is excited via an array of high-intensity light-emitting-diodes (LED) and is imbedded into the single recessed assembly. The light fixture may be configured such that it closely mimics existing, commonly available recessed ceiling lighting assemblies. By replacing the typically used incandescent light source and its accompanying high heat with the much cooler running and physically smaller LEDs, it becomes possible to integrate a high performance loudspeaker system into a light assembly.

FIG. 1 illustrates a cross-sectional view of a recessed assembly 100 having a light fixture 102 and an audio device 104 combination according to one embodiment of the invention. The light fixture 102 may include a light source 106. In one embodiment, the light source 106 is a circular array of LEDs mounted on a frame. The LEDs 106 are electrically affixed onto a circular printed circuit board (PCB) 108 and placed annularly to form the light fixture/source 102. The circular array of LEDs 106 may define a center opening through which a first audio device (e.g., tweeter) 104 may be mounted. The LEDs 106 may be mounted perpendicular to the plane that is defined by the sound-radiating surface of the first audio device 104. In this manner, the light emitted by the LEDs 106 radiates outward from the recessed assembly 100 and toward an intended location to be illuminated. In one embodiment of the invention, the light fixture 102 may be permanently or removably coupled to the first audio device 104. For example, the light fixture 102 may be integral with the first audio device 104 or it may be removable from the first audio device 104.

The LEDs 106 may be sufficient in number and/or of sufficient intensity to generate a light source of a desired intensity. In one embodiment of the invention, the light fixture 102 may come in different configurations to provide low, medium, or high light intensity. In yet another embodiment, a light fixture 102 may have two or more settings that permit generating two or more levels of light intensity. A switch electrically coupled to the light fixture 102 may allow a user to set the desired light intensity. Such light intensity may be regulated by controlling the current to one or more of the LEDs 106 or by selectively turning some LEDs ON while others remain OFF. Thus, different light intensities may be achieved with the light fixture 102.

Another embodiment of the invention provides for mounting additional LEDs on other surfaces or areas of the recessed assembly 100. For example, a plurality of LEDs may be mounted on the outer perimeter of the baffle 110 or on the interior walls of the baffle 110.

The first audio device 104 is mounted on a telescoping post 112 that is extendible or retractable to set the light fixture 102 or first audio device 104 at a desired level. The telescoping post 112 may provide a tube 114 through which electrical wires to the light fixture 102 and/or first audio device 104 are routed. Thus, the light fixture 102 can be securely mounted to the frame assembly and will not move or vibrate substantially even when the first audio devices 104 and a second audio device 116 are generating sounds.

Another feature of the invention provides a ball-and-socket mount on the telescoping post 112 that permits angling the light fixture 102 and/or first audio device 104 in a desired direction. The ball-and-socket mount may be adjustable to direct the light and/or sound as desired.

A second audio device 116 (e.g., woofer, etc.) may be mounted within the recessed assembly 100 to provide a different frequency range than the first audio device 104. The second audio device 116 may be mounted using a secondary frame concentric with the light fixture 102 with the extendible post 112 extending through the center of the second audio device 116. By mounting the first audio device 104 and light fixture 102 near the center of the recessed assembly 100 and keeping their diameter smaller than the diameter of the second audio device 116, sounds from the second audio device 116 are permitted to propagate substantially unobstructed. Network electronics 118 provide means to control the electronic functions of recessed assembly 100.

To further improve the sound dispersion from the second audio device 116, the light fixture 102 may include a conical baffle 120 that minimizes sound wave reflections off the backside of the light fixture 102. Instead, this conical baffle 120 allows sound waves from the second audio device to bend around the first audio device 104 and light fixture 102.

The recessed assembly 100 may also include onboard electronics drive unit and/or power conversion unit for the lighting system and/or speaker amplifier system that drives the first and/or second audio devices 104 and 116. The electronics drive unit and/or power conversion unit may be mounted on a PCB coupled to the rear of the recessed assembly 100 and run at a reduced voltage to improve safety and reduce overall power consumption.

Another feature of the invention provides one or more input interfaces on the recessed assembly. For example, the recessed assembly 100 can optionally feature inputs such as speaker-level audio signals to the one or more audio devices 104 and 116, and/or light control inputs to set the level of light intensity, etc.

In one implementation, a power transformer is provided on the recessed assembly 100 for public address applications (e.g., 75 volt power source). Another feature provides a local amplifier on the recessed assembly that enables low-level signals to power or drive the speaker(s) 104 and/or 116.

Yet another feature of the invention provides a built-in, wired or wireless IP based network interface (e.g., compliant with IEEE 802.11 standards, etc.). For example, the recessed assembly 100 may have one or more IP addresses associated with it so that the light fixture and/or speakers can be individually controlled. Such data or control interface may enable wired or wireless operation of the light fixture 102 and/or audio devices 104 and 116. For instance, a control system may control light intensity, speaker volume, etc. for each recessed assembly independently.

In yet another feature the invention may provide a circuit that, in one mode of operation causes the light fixture to flash in conjunction with a signal(s) received from smoke or carbon monoxide sensors and cause the lights to blink, flash or turn ON to alert those that are hearing impaired.

Another feature of the invention provides a light source that can selectably or randomly emit different colors of light. For instance, multi-colored LEDs may be employed that can be set (e.g., by voltage or current) to provide a given color of light. In this manner, the light source can radiate one or more colors, either one color at a time or a plurality of colors at once. Similarly, when the light source includes fiber optic strands, different colors can be created by a unit that provides different colors of light to the fiber optic strands.

Figure 2:
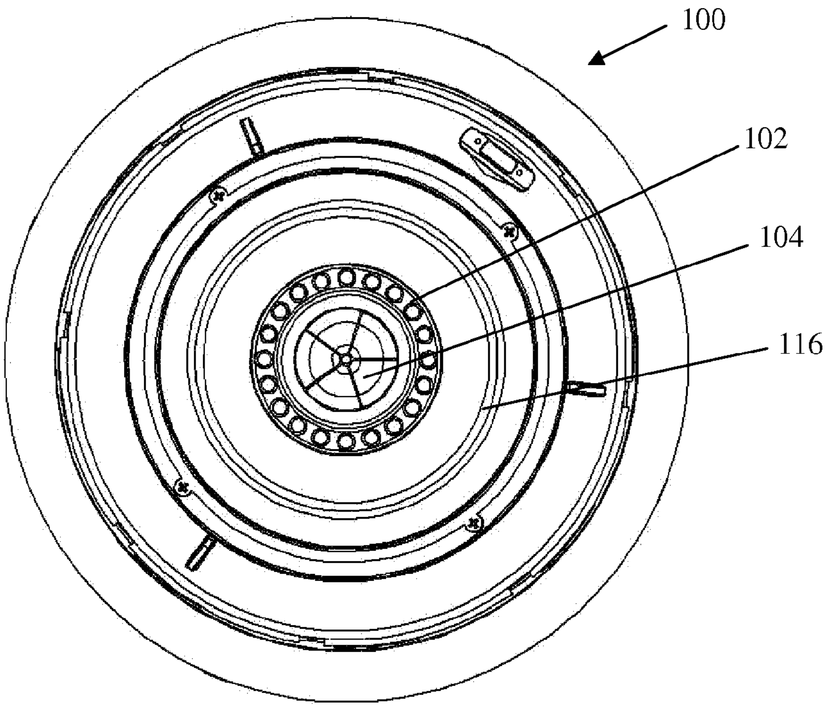
FIG. 2 illustrates a front view of the recessed assembly of FIG. 1 according to one embodiment of the invention.
Figure 3:
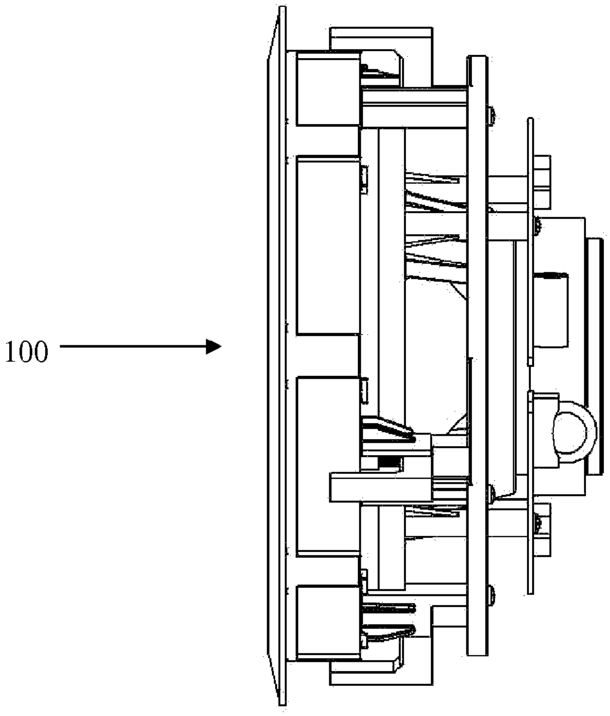
FIG. 3 illustrates a side view of the recessed assembly of FIG. 1 according to one embodiment of the invention.
Figure 4:
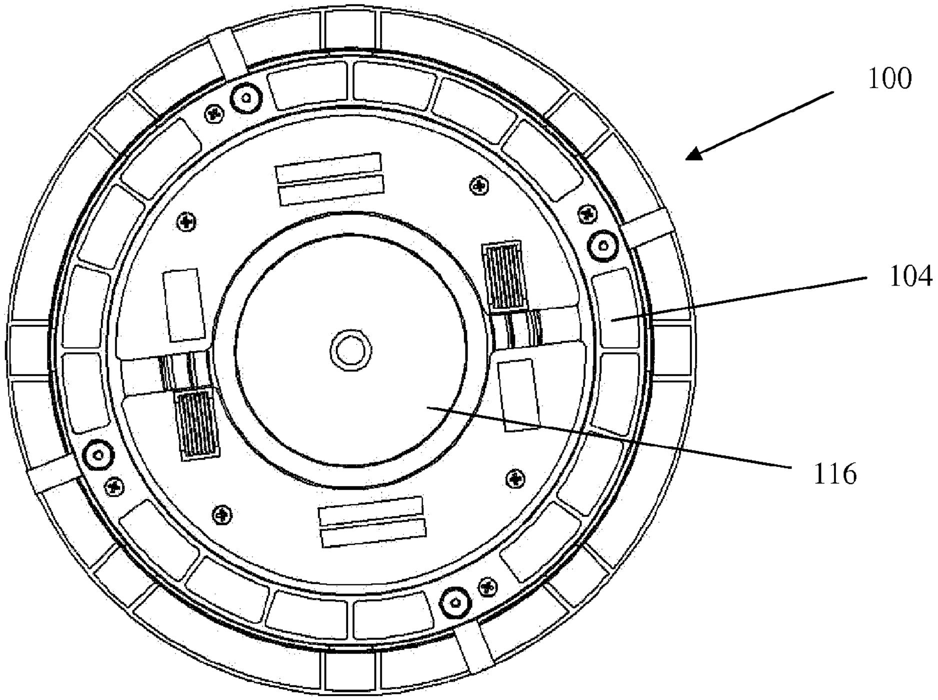
FIG. 4 illustrates a rear view of the recessed assembly of FIG. 1 according to one embodiment of the invention.

FIG. 2 illustrates a front view of the recessed assembly 100 of FIG. 1 according to one embodiment of the invention. As can be observed, the light fixture 102 is mounted substantially at the center of the recessed assembly 100 consistent with the traditional look of conventional recessed lights. FIG. 3 illustrates a side view of the recessed assembly 100 of FIG. 1 according to one embodiment of the invention. FIG. 4 illustrates a rear view of the recessed assembly 100 of FIG. 1 according to one embodiment of the invention.

Figure 5:
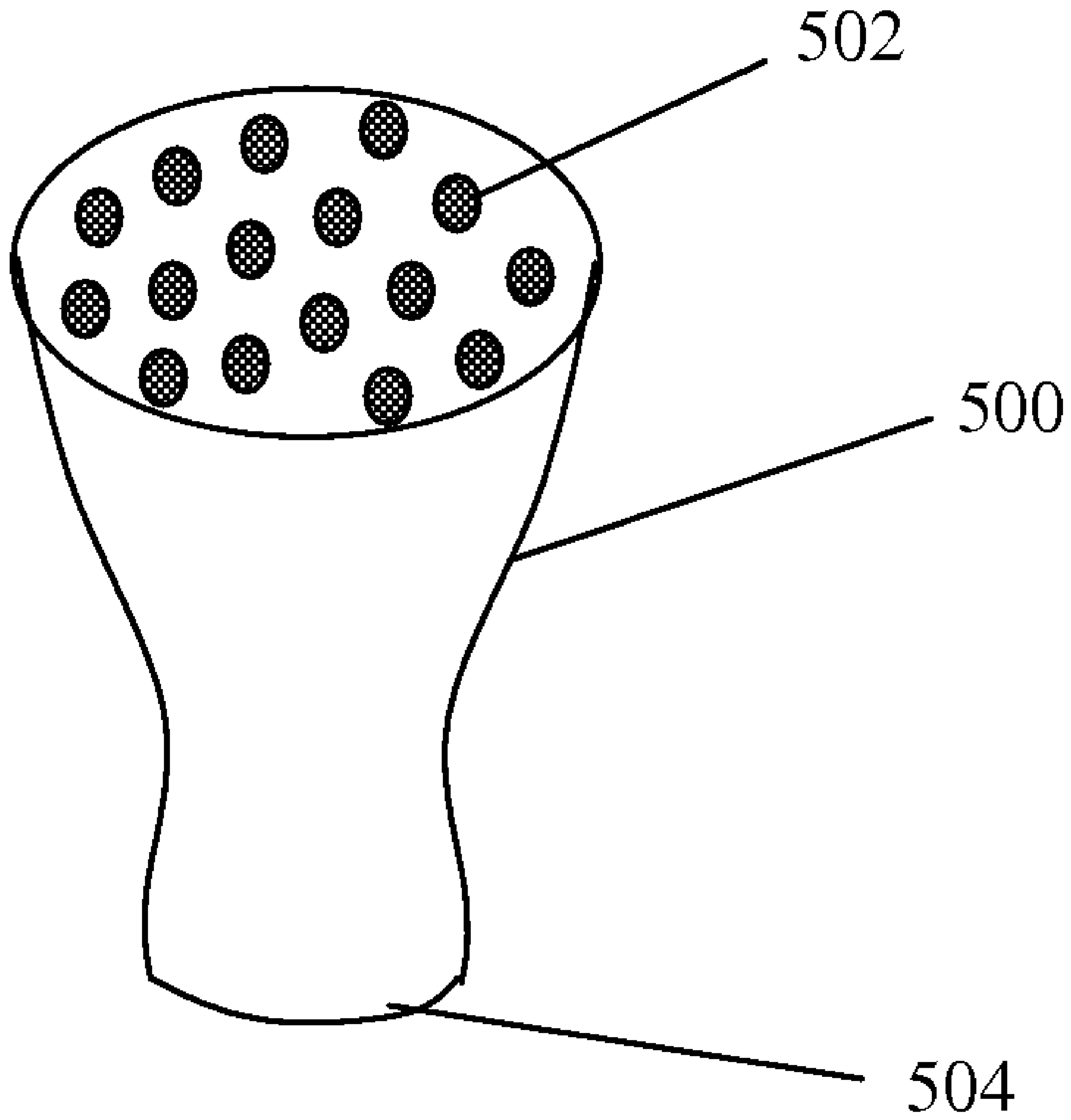
FIG. 5 illustrates another light fixture that may be used in one embodiment of the invention.

FIG. 5 illustrates another light fixture 502 that may be used in one embodiment of the invention. The light fixture 502 includes a plurality of light-emitting devices 502 (e.g., LEDs or fiber optic strands) covering the majority of the face of the light fixture 502. Referring to FIG. 1, the fiber optic strands may be routed through the passage 108 in the extension post 112 to a unit that provides light to the fiber optic strands. This implementation may increase the amount of light that is provided. The light fixture 502 may replace the first audio device 104 and light fixture 102 combination in the recessed assembly 102. That is, a coupling end 504 of the light fixture 502 may be mounted at the same location as the extendible post 112 and coupled to the recessed assembly. The second audio device 116 is still part of the recessed assembly. One implementation provides the light fixture 502 mounted on an extendible post so that its position relative to the second audio device 116 can be adjusted. In one example, the recessed assembly 100 may be configured to receive either the light fixture 502 or the light fixture 102 and first audio device 104 combination. Thus, an installer can interchange these components as desired during installation.

Figure 6A:
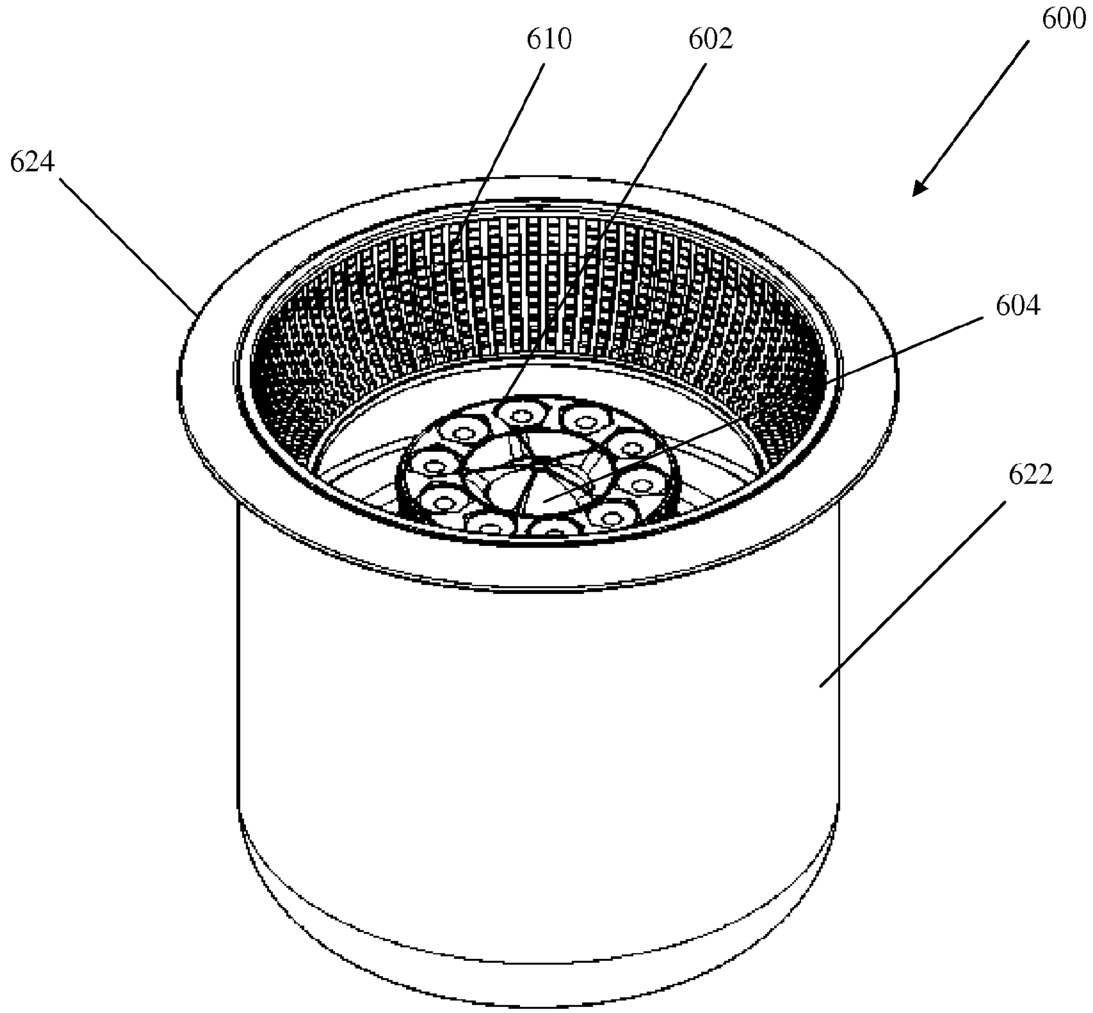
FIGS. 6A-6F illustrate various views of a recessed assembly having a light fixture and audio device combination according to another embodiment of the invention.

FIGS. 6A-6F illustrate various views of a recessed assembly 600 having a light fixture 602 including a light source 606 (see FIG. 6B) and an audio device 604 (see FIG. 6B) combined therein according to another embodiment of the invention. FIG. 6A is a perspective view of the recessed assembly 600. As shown, the recessed assembly 600 includes housing 622 in which multiple components of the recessed assembly 600 may be housed therein. The housing 622 may be approximately cylindrical in shape, however, other geometric configurations are within the scope of the invention. The housing 622 may be partially closed at a proximal end and open at a distal end. In one embodiment, the housing 622 may be adapted to mount between at least two ceiling joists of a ceiling in a room. In another embodiment, the housing 622 may be retrofitted into an already existing ceiling space through holes made to accommodate wiring. At least two components of the recessed assembly 600, i.e., the light fixture 602 and a baffle 610, are clearly shown in this view. The baffle 610 may be concentric and situated approximately adjacent to the distal end of the housing 622. In any event, the baffle 610 should approximate the geometric shape of the open distal end of the housing 622 so as to lay approximately adjacent thereto. A trim ring 624 may be situated at the lip of the housing 622 in order to provide a snug fit for the baffle 610 and also for aesthetic reasons. In one embodiment, the baffle 610 is perforated at predetermined locations so that the frequencies generated by the second audio device 616 are free to propagate through it. The baffle 610 also may serve to as a "light baffle" that prevent seeing into the fixture and constraining/masking any non-directional light that might be reflected in and around the inside of the fixture. Also shown in FIG. 6A is the light fixture 602 (including a first audio device 604 and a light source 606), which is described in more detail below.

Figure 6B:
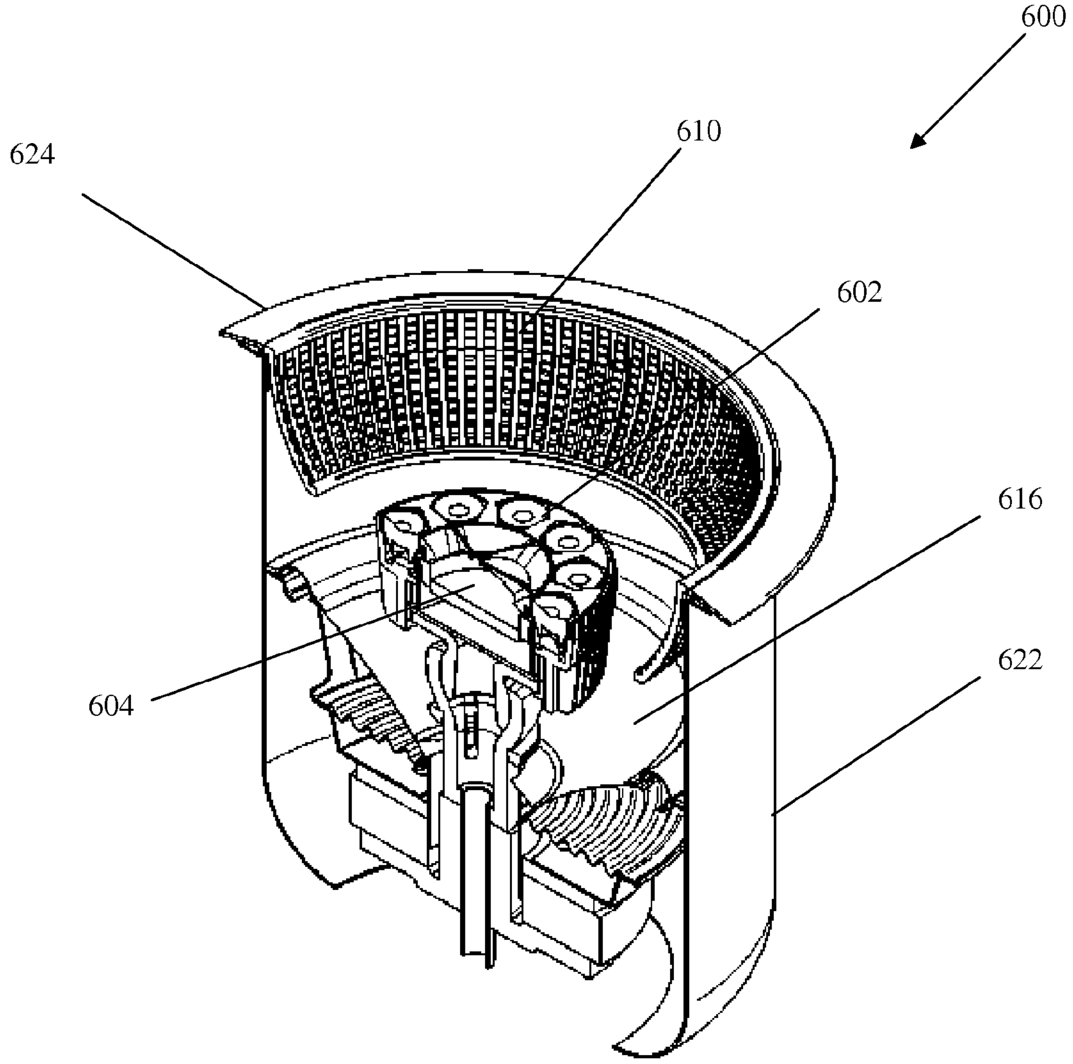

FIG. 6B is a cross-sectional view of the recessed assembly illustrated in FIG. 6A. In addition to housing 622, light fixture 602, and baffle 610, FIG. 6B illustrates a second audio device 616 housed within the housing 622. As shown, the second audio device 616 is situated toward the proximal end of the housing 622 while the light fixture 602 is situated toward the distal (open) end of the housing 622. That is, the second audio device 616 is situated at a distance from the light fixture 602. The second audio device 616 may include an opening at the center wherein the opening is adapted to receive an extendible post 612 of the light fixture 602. In one embodiment, the first audio device 604 may be a tweeter and the second audio device 616 may be a woofer. This configuration may allow for optimal sound propagation.

Figure 6C:
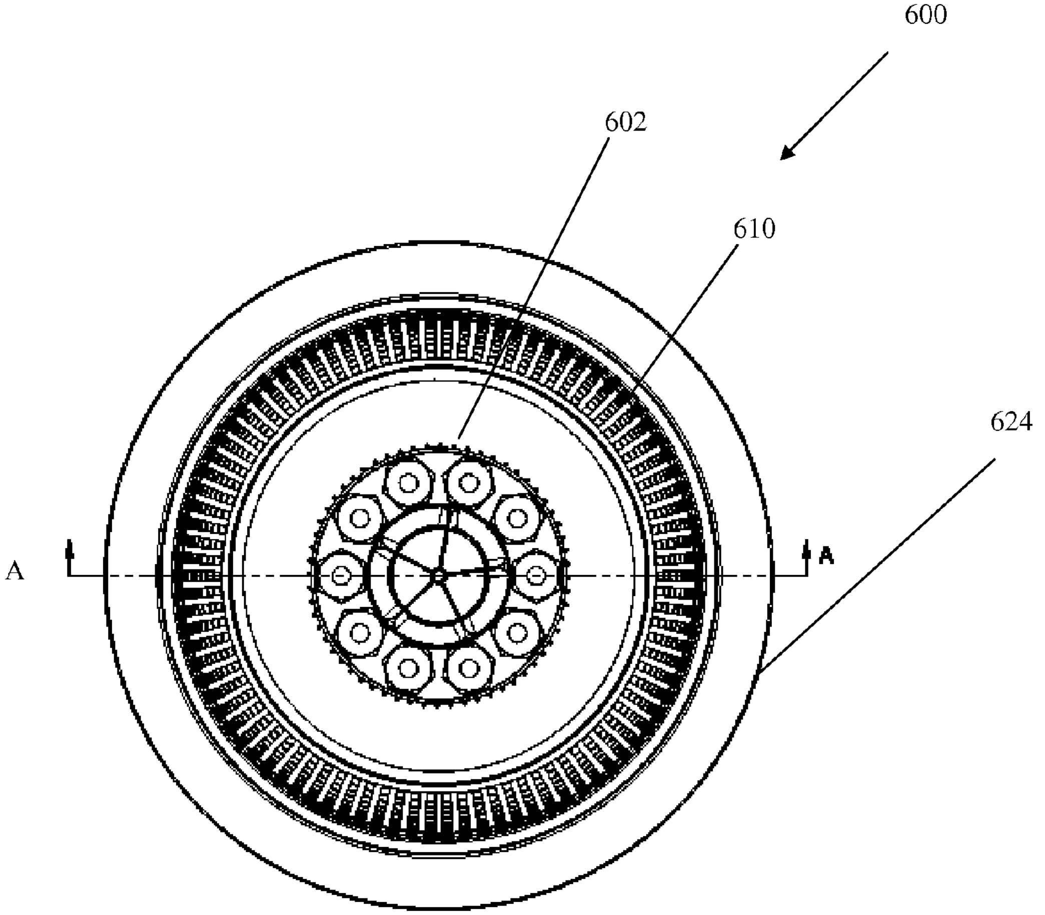
Figure 6D:
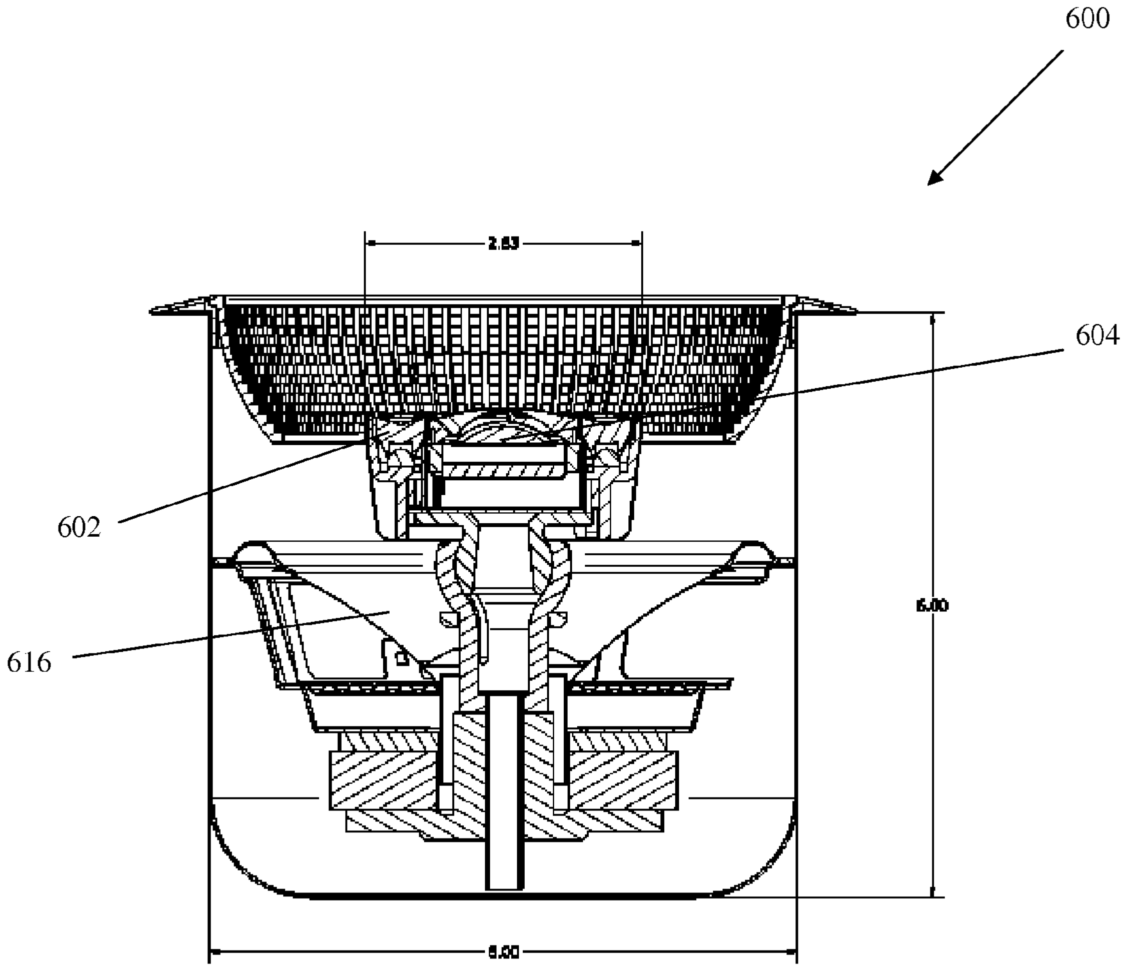
Figure 6E:
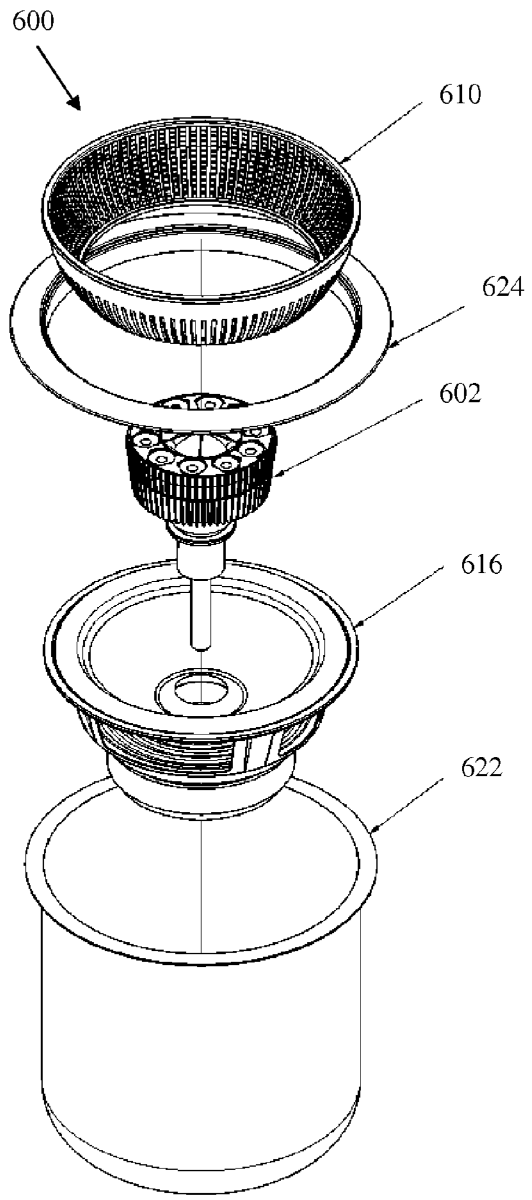
Figure 6F:
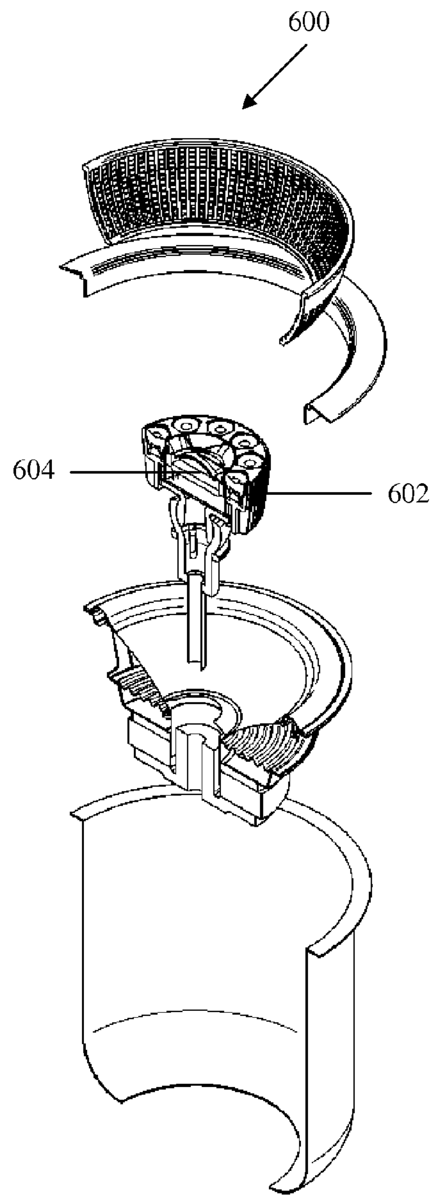

FIG. 6C is a top view of the recessed assembly 600 of FIG. 6A. At least the light fixture 602, the baffle 610, and the trim ring 624 are clearly visible in this view. FIG. 6D is a cross-sectional view of the recessed assembly 600 of FIG. 6C taken on lines A-A. FIG. 6E is an exploded view of the recessed assembly of FIG. 6A. As shown, the housing 622 at least houses the second audio device 616 and the light fixture 602. The trim ring 624 may be situated on the lip of the housing 622 with the baffle 610 situated therein. FIG. 6F is a cross-sectional exploded view of the recessed assembly of FIG. 6E.

Figure 7A:
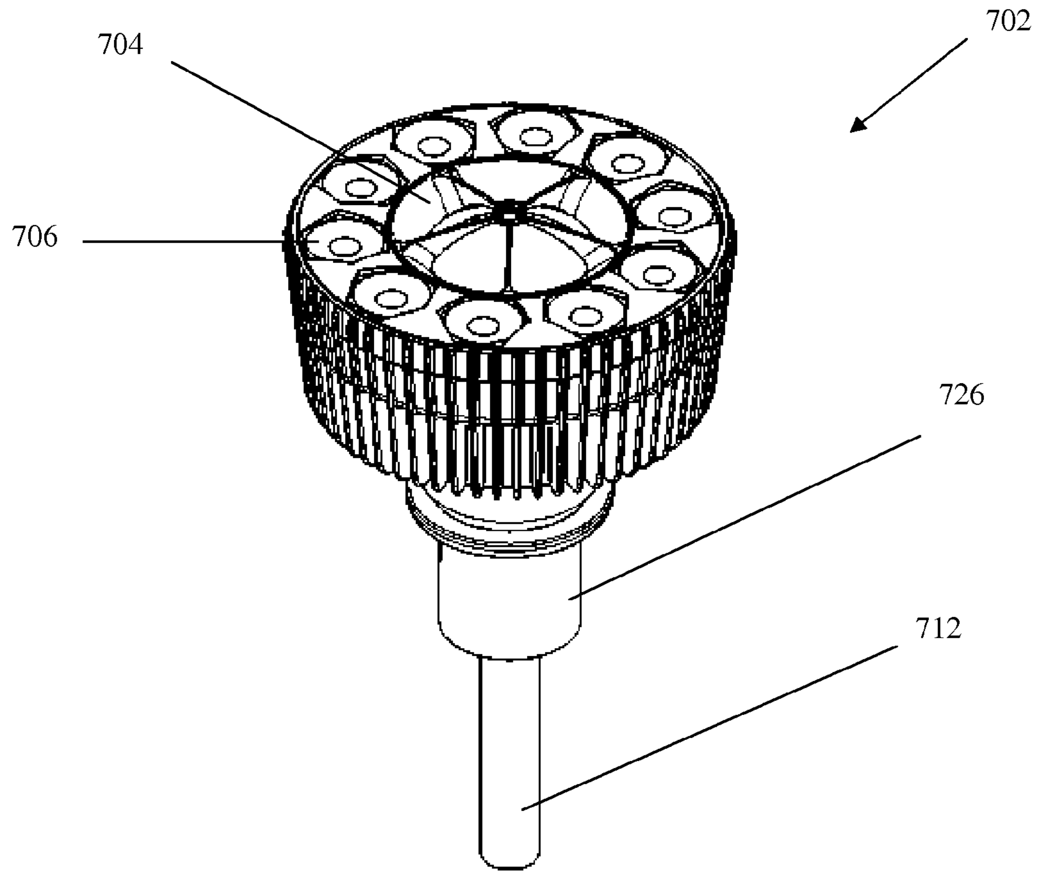
FIGS. 7A-7G illustrate various views of a light fixture according to an embodiment of the invention.

FIGS. 7A-7G illustrate various views of a light fixture 702 having an audio device 704 and a light source 706 combined therein according to an embodiment of the invention. FIG. 7A is a perspective view of the light fixture 702. According to the embodiment, light fixture 702 includes an attaching means 712 at a proximal end, a moveable means 726 at a medial portion, and a first audio device 704 and a light source 706 combined therein at a distal end. In one embodiment, an extendible post (not shown) may be received within the attaching means 712 which may be, in one embodiment, a threaded hollow screw or equivalent thereof. In one embodiment, the moveable means 726 may be a "ball-and-socket" configuration. For example, the moveable means 726 may include a socket pedestal 728 (see FIG. 7F), a rotational ball mount 730 (see FIG. 7F), and a socket lock 732 (see FIG. 7F); however, other moveable means are within the scope of the invention. As discussed previously, the distal end of the light fixture 702 includes a first audio device 704 (see FIG. 7F) and a light source 706 (see FIG. 7F). In one embodiment, the light source 706 may be a plurality of LEDs situated in a circular array about an inner circumference, i.e., on a "shelf", within an annular frame 734. The annular frame 734 may be, for example, a heat sink (see FIGS. 8A-8D). The heat sink 734 may further house a plurality of optics 736, an optics mask 738, the first audio device 704, and a first audio device guard 740 (explained in more detail below).

Figure 7B:
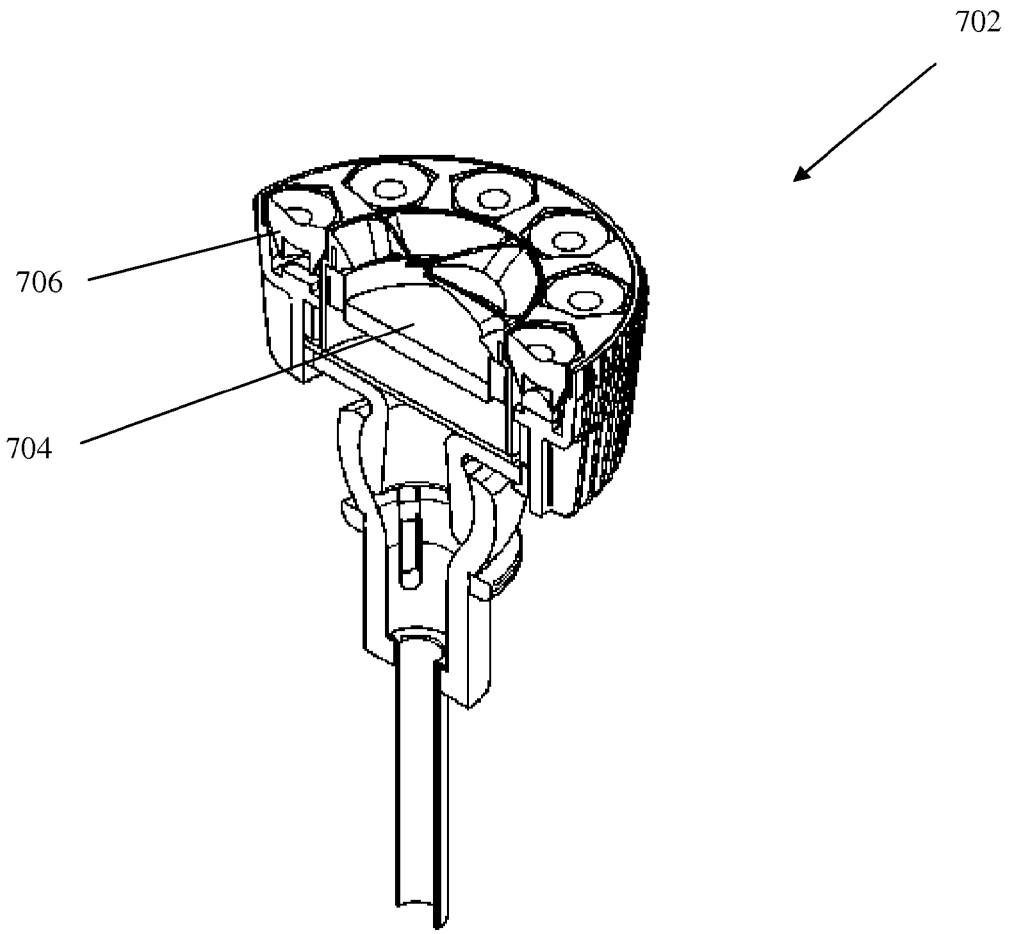
Figure 7C:
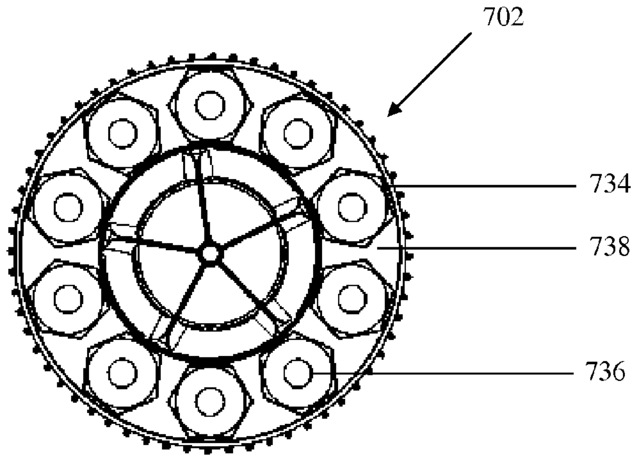
Figure 7D:
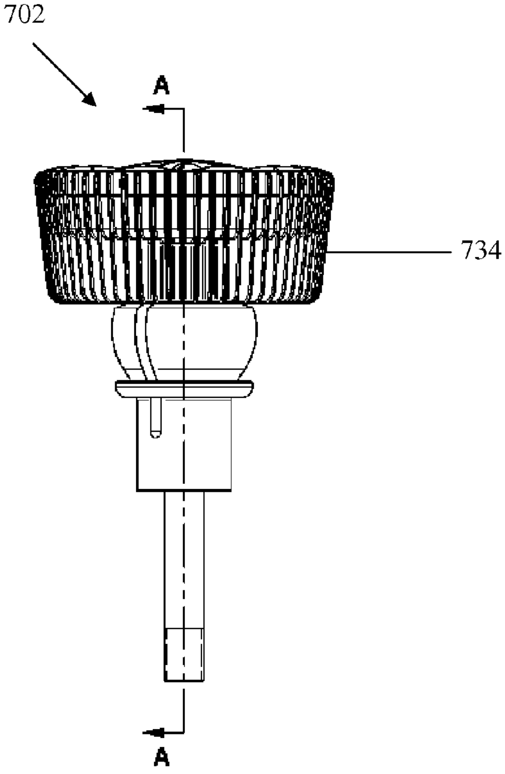
Figure 7E:
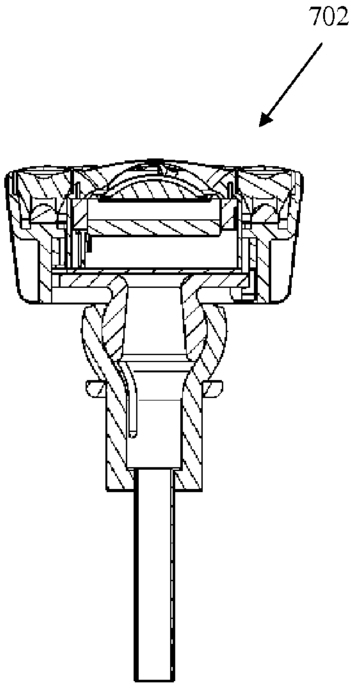

FIG. 7B is a cross-sectional view of the light fixture illustrated in FIG. 7A. In addition to the components previously discussed, FIG. 7B illustrates additional components which will be explained in detail with reference to FIGS. 7F-7G. FIG. 7C is a top view of the light fixture 702 of FIG. 7A. At least the heat sink 734, the plurality of optics 736, the optics mask 738, and the first audio device guard 740 are clearly visible in this view. FIG. 7D is a side perspective view of the light fixture illustrated in FIG. 7A. FIG. 7E is a cross-sectional view of the light fixture illustrated in FIG. 7D taken at lines A-A.

Figure 7F:
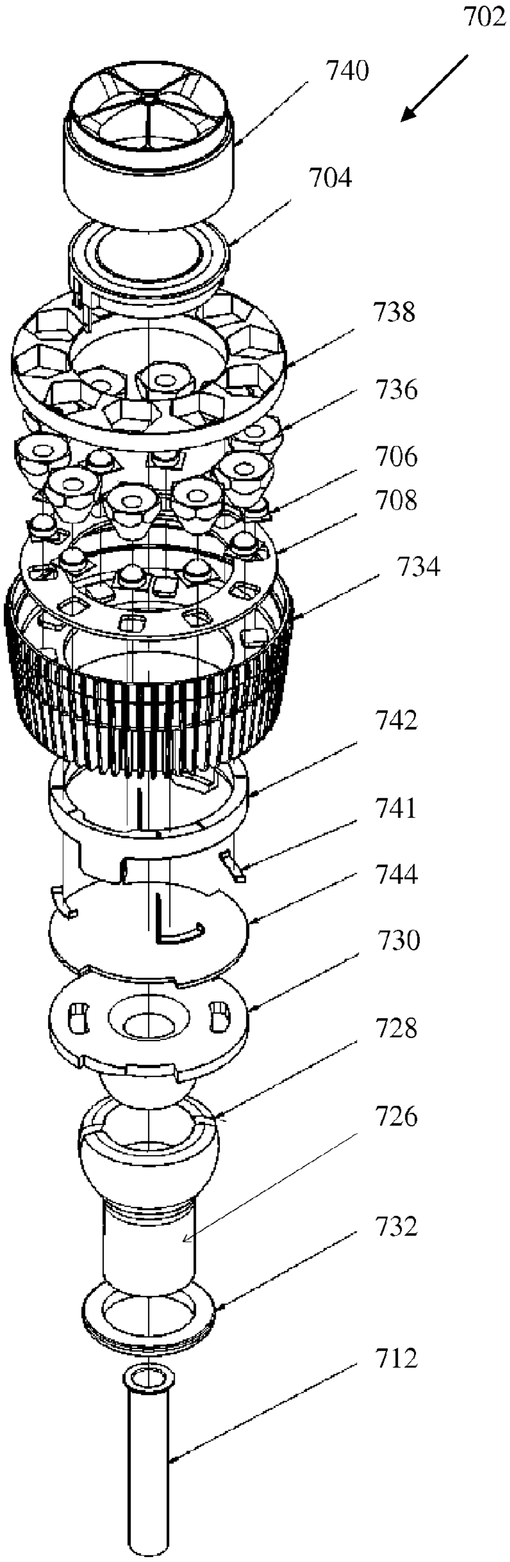

FIG. 7F is an exploded view of the light fixture 702 illustrated in FIG. 7A. The components which may be assembled to produce the light fixture 702 include, but are not limited to, the attaching means 712, the moveable means 726 (including the socket pedestal 728, the rotational ball mount 730, and the socket lock 732), a PCB 708, and the heat sink 734 which houses the plurality of LEDs 706, the plurality of optics 736, the optics mask 738, the first audio device 704 and the first audio device guard 740. A plurality of contacts 740 may provide communication between the PCB 708 and the LEDs 706. Also, a contact PCB 744 may electronically communicate to the PCB 708 via the plurality of contacts 741. In this embodiment, moveable means 726 including the socket pedestal 728, the rotational ball mount 730, and the socket lock 732 allows for rotational movement of the light fixture 702. Thus, when the light fixture 702 is situated within a housing (such as that illustrated in FIG. 6A-6F) wherein the housing in mounted on a ceiling, the light fixture 702 can be rotated in a direction desired by a user. As a result, light and/or sound can be directionally controlled by the user.

Figure 7G:
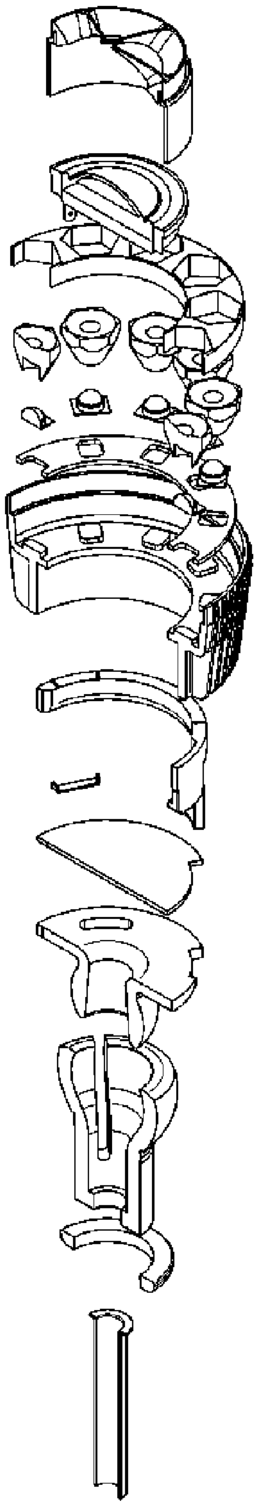

In some embodiments, the combination of the heat sink 734, the plurality of LEDs 706, the plurality of optics 736, and the optics mask 738 functions to replace a conventional light bulb (discussed previously). Light output parity with conventional lighting devices may be achieved through the use of circularly arrayed LEDs 706. In one embodiment, the LEDs 706 are High Brightness Light Emitting Diodes (HBLEDs). Currently, commercially available HBLEDs are able to generate in excess of eighty-seven (87) lumens per watt at current levels of three hundred and fifty (350) milliamps (mA), that output color correlated temperature (CCT) in between 3700 and 2600 Kelvin (K) with Color Rendering Indexes (CRI) in excess of eighty (80). As a result, the embodiment described equals or exceeds typical incandescent light outputs while only using a fifth of the power. Even with power conversion and optical losses, the light fixture 702 can generate net outputs in excess of six hundred and fifty (650) lumens. By increasing the current to seven hundred (700) mA, outputs can be increased but at the cost of overall lifetimes. FIG. 7G is a cross-sectional exploded view of the recessed assembly of FIG. 7F.

Figure 8A:
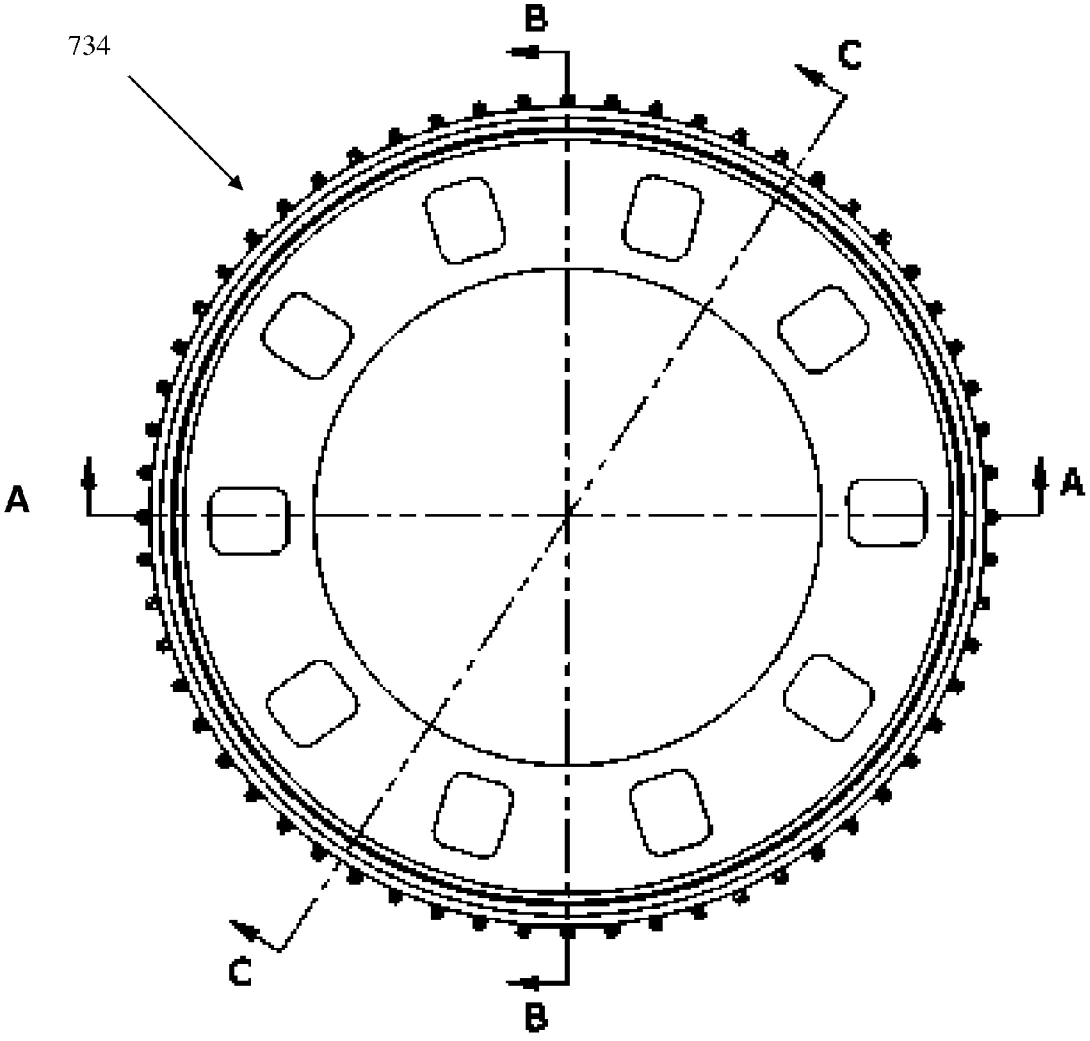
FIGS. 8A-8D illustrate various views of an annular frame according to an embodiment of the invention.
Figure 8B:
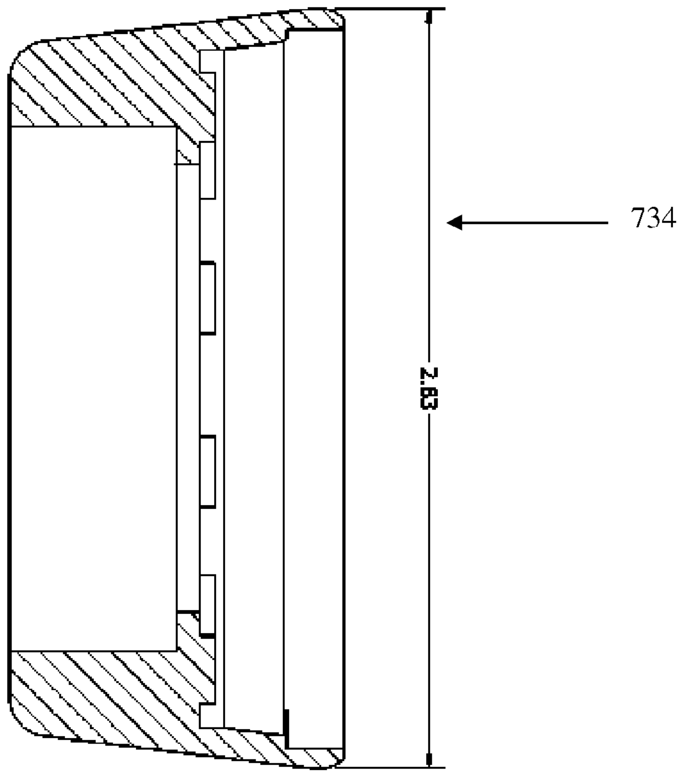
Figure 8C:
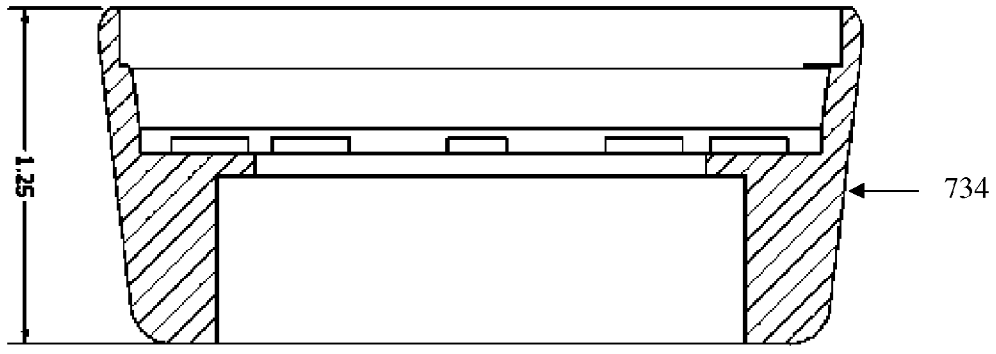
Figure 8D:
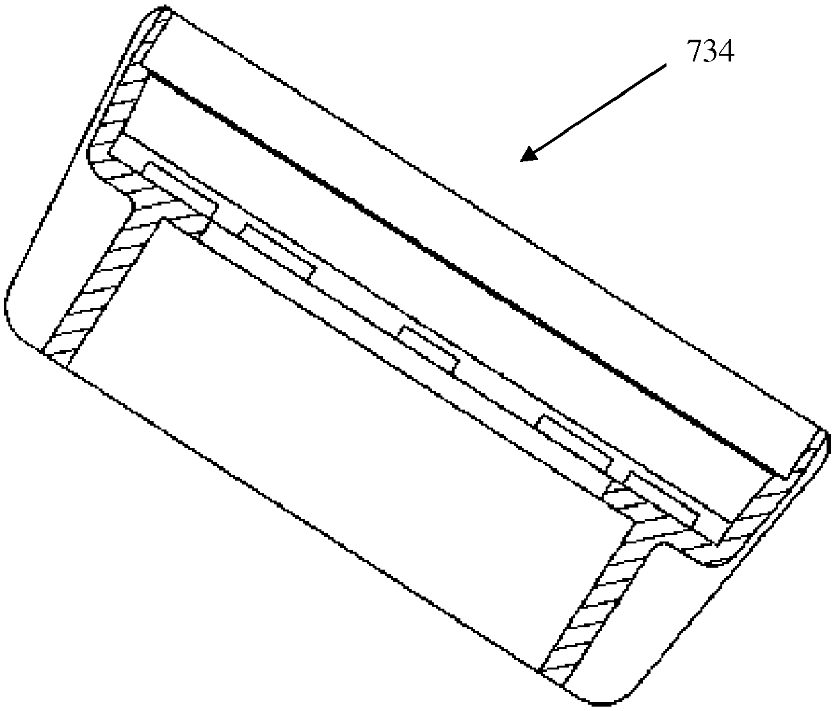

FIGS. 8A-8D are various views of the annular frame 734, e.g., heatsink, illustrated in FIGS. 7A-7G. As discussed previously, the annular frame 734 may simultaneously support a first audio device 704, e.g., a tweeter, and a plurality of LEDs 706 on a "shelf" within an inner circumference therein. FIG. 8A is a top view of the annular frame 734. FIGS. 8B-8D are cross-sectional views of the annular frame 734 taken along lines A-A, B-B, and C-C, respectively. The embodiments described with reference to FIGS. 6A-6F, 7A-7G and 8A-8D may be assembled and/or perform the same as or substantially the same as those embodiments described with reference to FIGS. 1-4.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A recessed assembly comprising:
a housing having an open end and a partially closed end;
a light fixture including an annular frame and a plurality of non-modulating, closely-spaced light-emitting diodes (LEDs) mounted within the annular frame, the light fixture replaceable as a single unit and centrally mounted within the housing toward the open end;
a first speaker mounted within the annular frame of the light fixture; and
a second speaker mounted within the housing toward the partially closed end and a distance behind the light fixture, wherein sound from the second speaker is substantially unobstructed by the light fixture and wherein the light-emitting diodes are operated independent of sounds from the first and second speakers.

2. The recessed assembly of claim 1 wherein the LEDs are mounted concentrically on a shelf within the annular frame, the annular frame defining an opening through which the first speaker is mounted.

3. The recessed assembly of claim 1, further comprising:
a plurality of optics mounted on the plurality of LEDs.

4. The recessed assembly of claim 1, further comprising:
telescoping means coupled to the light fixture to adjust the relative position of the light fixture and first speaker along a longitudinal axis.

5. The recessed assembly of claim 1 further comprising:
a socket pedestal, a rotational ball mount, and a socket lock that operate to allow the light fixture to be adjusted at an angle.

6. The recessed assembly of claim 3 further comprising:
an electronic device for controlling operation of the light fixture and the first and second speakers.

7. The recessed assembly of claim 1 wherein the plurality of LEDs provide an amount of light in range of between 500 lumens and 900 lumens.

8. The recessed assembly of claim 1 further comprising:
an extendible post coupled to the first speaker at one end and coupled to the second speaker at the other end, the extendible post permitting mounting the first speaker at different heights relative to the second speaker.

9. The recessed assembly of claim 1 further comprising:
a control circuit adapted to selectively regulate the light intensity to one or more of the LEDs.

10. The recessed assembly of claim 1 wherein the housing is adapted to be installed into a ceiling.

11. The recessed assembly of claim 1 wherein the second speaker is configured to generate sounds in a second frequency band and the first speaker is configured to generate sounds in a first frequency band.

12. The recessed assembly of claim 11, wherein the second frequency band is a low frequency band and the first frequency band is a high frequency band.

13. A recessed assembly comprising:

housing means for securing the recessed assembly within a recessed space;

a light fixture including supporting means and a plurality of non-modulating, closely-spaced light-emitting diodes (LEDs) mounted within the supporting means, the light fixture replaceable as a single unit and centrally mounted within the housing means;

first sound-generating means for generating sounds in a first frequency band, wherein the first-sound generating means are mounted within the supporting means and adjacent the closely-spaced light-emitting diodes; and second sound-generating means for generating sounds in a second frequency band, wherein sound from the second sound-generating means is substantially unobstructed by the light fixture.

14. The recessed assembly of claim 13, further comprising:

means for adjusting the intensity of the illumination means independently from the sound-generating means.

15. A light and speaker combination device, comprising:

a cylindrical housing having an open end;

an illumination device capable of providing an amount of light in range of between 500 lumens and 900 lumens mounted within the cylindrical housing, the illumination device replaceable as a single unit;

a first speaker coupled to the illumination device; and a second speaker mounted a distance in back of the first speaker and within the cylindrical housing wherein sound from the second speaker is substantially unobstructed by the illumination device and wherein the illumination device is operated independent of sounds from the first and second speakers.

16. The light and speaker device of claim 15 wherein the illumination device includes a plurality of non-pulsing, closely spaced light-emitting-diodes (LEDs).

17. The light and speaker device of claim 16, further comprising:

a control circuit adapted to selectively regulate the light intensity to one or more of the LEDs.

18. The light and speaker device of claim 16 wherein the LEDs are mounted on an annular frame that defines an opening through which the first speaker is mounted.

19. The light and speaker device of claim 15 further comprising:

an extendible post permitting adjusting the illumination device and first speaker at different heights relative to the second speaker; and an angling mechanism that allows the illumination device and first speaker to be angled to direct their respective light and sound in a desired direction.

* * * * *